United States Patent [19]
Seward

[11] Patent Number: 5,696,872
[45] Date of Patent: Dec. 9, 1997

[54] THERMAL ENERGY STORAGE AND EXCHANGER DEVICE

[76] Inventor: Harold H. Seward, 16 Frost St., Arlington, Mass. 02174

[21] Appl. No.: 320,257

[22] Filed: Oct. 7, 1994

[51] Int. Cl.$^6$ ............................................. F24H 7/02
[52] U.S. Cl. .................... 392/341; 392/354; 392/357; 219/400
[58] Field of Search .................... 392/341, 344, 392/354, 357, 485; 165/DIG. 356, DIG. 359, DIG. 444, 166, DIG. 393; 219/400, 530, 540; 126/273 R, 275 R, 275 E; 432/219, 120; 110/326; 373/109

[56] References Cited

U.S. PATENT DOCUMENTS

| 821,518 | 5/1906 | Maslin et al. | 165/166 |
|---|---|---|---|
| 1,686,614 | 10/1928 | Hume | 165/166 |
| 2,023,965 | 12/1935 | Lysholm | 165/10 |
| 2,221,703 | 11/1940 | Falco | 392/364 |
| 2,474,664 | 6/1949 | Grabeau | 219/400 |
| 4,077,464 | 3/1978 | Moog et al. | 165/18 |
| 4,127,973 | 12/1978 | Kachadorian | 52/169.11 |
| 4,149,522 | 4/1979 | Keeling | 126/648 |
| 4,209,060 | 6/1980 | Wiking et al. | 165/8 |
| 4,449,573 | 5/1984 | Pettersson et al. | 165/10 |
| 4,452,228 | 6/1984 | Meyer | 126/563 |
| 4,452,229 | 6/1984 | Powers | 126/632 |
| 4,953,629 | 9/1990 | Karlsson et al. | 165/10 |

FOREIGN PATENT DOCUMENTS

| 1200771 | 12/1959 | France | 219/400 |
|---|---|---|---|
| 470636 | 5/1969 | Switzerland | 392/344 |
| 1279404 | 6/1972 | United Kingdom | 392/344 |

OTHER PUBLICATIONS

Spiegel, Stephen J., "Automakers Warm Up to Quick-Heat Device", The Boston Globe, Nov. 29, 1993.

*Primary Examiner*—Tu B. Hoang
*Attorney, Agent, or Firm*—Iandiorio & Teska

[57] ABSTRACT

A thermal energy storage and exchanger device includes, a plurality of horizontal, superimposed, spaced plates defining a plurality of clear, horizontal, continuous, uniformly spaced flow passageways between them; and introduction means selectively operable for driving a thermal energy exchanger fluid horizontally through the flow passageways to introduce thermal energy to the plates in one mode and extract thermal energy from the plates in a second mode; the plates being vertically spaced and horizontally oriented for minimizing convection and heat exchange in a third, storage mode when the thermal energy exchanger fluid resides in the flow passageways undriven by the introduction means.

21 Claims, 11 Drawing Sheets

THERMAL ENERGY STORAGE AND EXCHANGER DEVICE

FIELD OF INVENTION

This invention relates to a thermal energy storage and exchanger device add more particularly to such a device that may be used in convection ovens or a device which may be used in conjunction with cooling systems.

BACKGROUND OF INVENTION

Convection ovens are typically used in commercial baking operations, particularly in fast food retail operations. These convection ovens are pre-heated to the proper temperature and product is inserted into the oven for baking. One problem with these ovens is maintaining a constant baking temperature, as a substantial amount of energy is lost as hot oven air flows out along the oven ceiling and the colder room air rushes in along the oven threshold when the oven door is opened. In .fast food retail operations the oven door is frequently opened and heat loss varies greatly with each door opening. Thus, baking temperatures can vary widely and, as a result, the quality and uniformity of the product can suffer greatly. Products in fast food retail operations typically require short baking times and so their quality is even more sensitive to variations in temperature.

Another problem with typical convection ovens used in retail fast food operations is the power rating or the rate at which energy can be added to the oven cavity by the heating element. This is particularly troublesome when baking still-frozen products that require more heating energy at the start, causing the oven temperature to drop too fast and/or too far to ensure a proper bake, particularly when a larger load of product is placed in the oven. The oven air heat being transferred to the frozen products is replenished by the heater and by the latent heat in the oven surfaces but at a rate which is insufficient to maintain the temperature of the oven. Over time, the heater will bring the oven air up to the thermostat set point, however, this may be too slow for the proper bake to occur.

One approach to solving the power rating limitation problem in typical convection ovens is to bake thawed product. This approach is not without disadvantages, though. While a lower power rating is required for the baking of thawed product the total freezer-to-finish bake time is three to five times as long. In fast food operations freezer to finish time is a foremost priority. Prolonging this time makes it much more difficult to respond promptly to fast food customer demands. While using thawed product does reduce oven energy costs, these economies are lost because of the overages and/or shortages of thawed or finished products which result from prolonged freezer-to-finish times.

Other disadvantages to thawing include waste and quality problems due to moisture condensation, drying, and sogginess. Thawing operations also take additional space, equipment and require further training of personnel. Thawing operations also make it difficult to take inventory of and to store the product for each stage of production. This is primarily due to the fact that thawing takes approximately three times as long as baking. At full production rates the inventory being thawed must be three times that of the inventory in the oven, thus additional storage space is necessary for the thawing operation and inventory is more difficult to manage.

One approach taken to compensate for an excessive drop in oven temperature is to preheat the oven to a higher temperature. This approach is not usually satisfactory, as it could result in a poor product. Additionally, preheating the oven to a higher temperature causes greater heat leakage which results in increased energy costs in heating the oven and in air conditioning due to increased heat in the facility where the oven is located.

Another approach taken has been to use masses of solid material such as thick cast-iron or stone plates in the oven to allow energy to be stored and transferred to the product. These masses, however, tend to absorb and release heat at a much slower rate than the frozen product absorbs it. Thus, this approach does not solve the temperature control problem and the slow release of heat results in greater baking temperature drops and longer pre-heat/recovery times, often causing bad baking results. The additional time it takes to preheat these plates is a burden. However, once heated it does reduce the oven pre-heat time for the next baking cycle.

SUMMARY OF INVENTION

It is therefore an object of this invention to provide a thermal energy and exchanger device that supplements the heat source of the oven, in effect creating a higher energy and power input to the oven air.

It is a further object of this invention to provide such a thermal energy storage and exchanger device that is capable of providing the additional thermal energy required to thaw a product transferred directly from freezer to oven.

It is a further object of this invention to provide such a thermal energy storage and exchanger device that is capable of maintaining a more constant baking temperature when the oven door is opened and closed.

It is a further object of this invention to provide a thermal energy storage and exchanger device that is capable of storing substantial thermal energy with a lower rate of loss.

It is a further object of this invention to provide such a thermal energy storage and exchanger device which is capable of transferring substantial thermal energy rapidly to and from fluids which flow horizontally through the device.

It is a further object of this invention to provide such a thermal energy storage and exchanger device that efficiently absorbs and stores thermal energy remaining in the oven from a previous bake to reduce preheat time necessary for succeeding bakes.

It is a further object of this invention to provide such a thermal energy storage and exchanger device that allows larger batches of product to be baked without increasing baking time or temperature.

It is a further object of this invention to provide such a thermal energy storage and exchanger device that is capable of providing a more consistent quality of baked product.

It is a further object of this invention to provide such a thermal energy storage and exchanger device that is capable of storing cold energy when the device is utilized in an inverted configuration.

This invention results from the realization that a truly effective thermal energy storage and exchanger device can be achieved by introducing a thermal energy exchanger fluid horizontally through a plurality of flow passageways defined by a stack of horizontal, superimposed plates for introducing thermal energy to the plates in one mode, extracting thermal energy from the plates in a second mode and storing thermal energy in a third, storage mode when the thermal energy exchanger fluid resides in the flow passageways.

This invention features a thermal energy storage and exchanger device that includes a plurality of horizontal, superimposed, spaced plates defining a plurality of clear, horizontal, continuous, uniformly spaced flow passageways between them. There are introduction means selectively operable for driving a thermal energy exchanger fluid horizontally through the flow passageways to introduce thermal energy to the plates in one mode and extract thermal energy from the plates in a second mode. The plates are vertically spaced and horizontally oriented for minimizing convection and thermal energy exchange in a third, storage mode when the thermal energy exchanger fluid resides in the flow passageways undriven by the introduction means.

In a preferred embodiment of the thermal energy storage and exchanger device the introduction means may include pump means for driving the thermal energy fluid through the flow passageways for exchanging the thermal energy with the plates. The plurality of plates may be arranged in a flat stack or the plates may be arranged in an arched stack. The plurality of plates may be arranged in a domed stack. The plurality of plates may be spaced between 1.25 and 4.0 millimeters apart. There may be further included sidecovers for closing the flow passageways along their edges extending along the flow direction of the fluid for reducing fluid escape from the flow passageways.

The invention also features an improved convection oven in which there is included a baffle for forming a capped volume beneath the ceiling of the convection oven. There is also a thermal energy storage and exchanger means contained in the capped volume which includes a plurality of horizontal, superimposed, spaced plates defining a plurality of clear, continuous, uniformly spaced flow passageways between them. There are also pump means selectively operable for driving a thermal energy exchanger fluid horizontally through the flow passageways to introduce thermal energy to the plates in one mode and extract thermal energy from the plates in a second mode. The plates are vertically spaced and horizontally oriented for minimizing convection and thermal energy exchange in a third, storage mode when the thermal energy exchanger fluid resides in the channels undriven by the pump means.

In a preferred embodiment the improved convection oven may include a plurality of plates arranged in a flat stack. The plurality of plates may also be arranged in an arched stack. The plates may also be arranged in a domed stack. The plates may be spaced between 1.25 and 4.0 millimeters apart. There may also be included sidecovers for closing the flow passageways along their edges extending along the flow direction of the fluid from the inlets to the outlets of flow passageways for reducing fluid escape from the flow passageways.

The device also features a thermal energy storage and exchanger device that includes a plurality of horizontal, superimposed, spaced, concave plates defining a plurality of clear, continuous, uniformly spaced, concave flow passageways between them. There are pump means selectively operable for driving a thermal energy exchanger fluid horizontally through the flow passageways to introduce thermal energy to the plates in one mode and extract thermal energy from the plates in a second mode. The plates are vertically spaced and horizontally oriented for minimizing convection and heat exchange in a third, storage mode when the thermal energy exchanger fluid resides in the flow passageways undriven by the pump means.

In a preferred embodiment, the underside of the plates or the topsides of the plates may be concave. The plates may also be dome shaped or they may be arched.

DISCLOSURE OF PREFERRED EMBODIMENT

Other objects, features and advantages will occur to those skilled in the art from the following description of a preferred embodiment and the accompanying drawings, in which.

Figure 1:
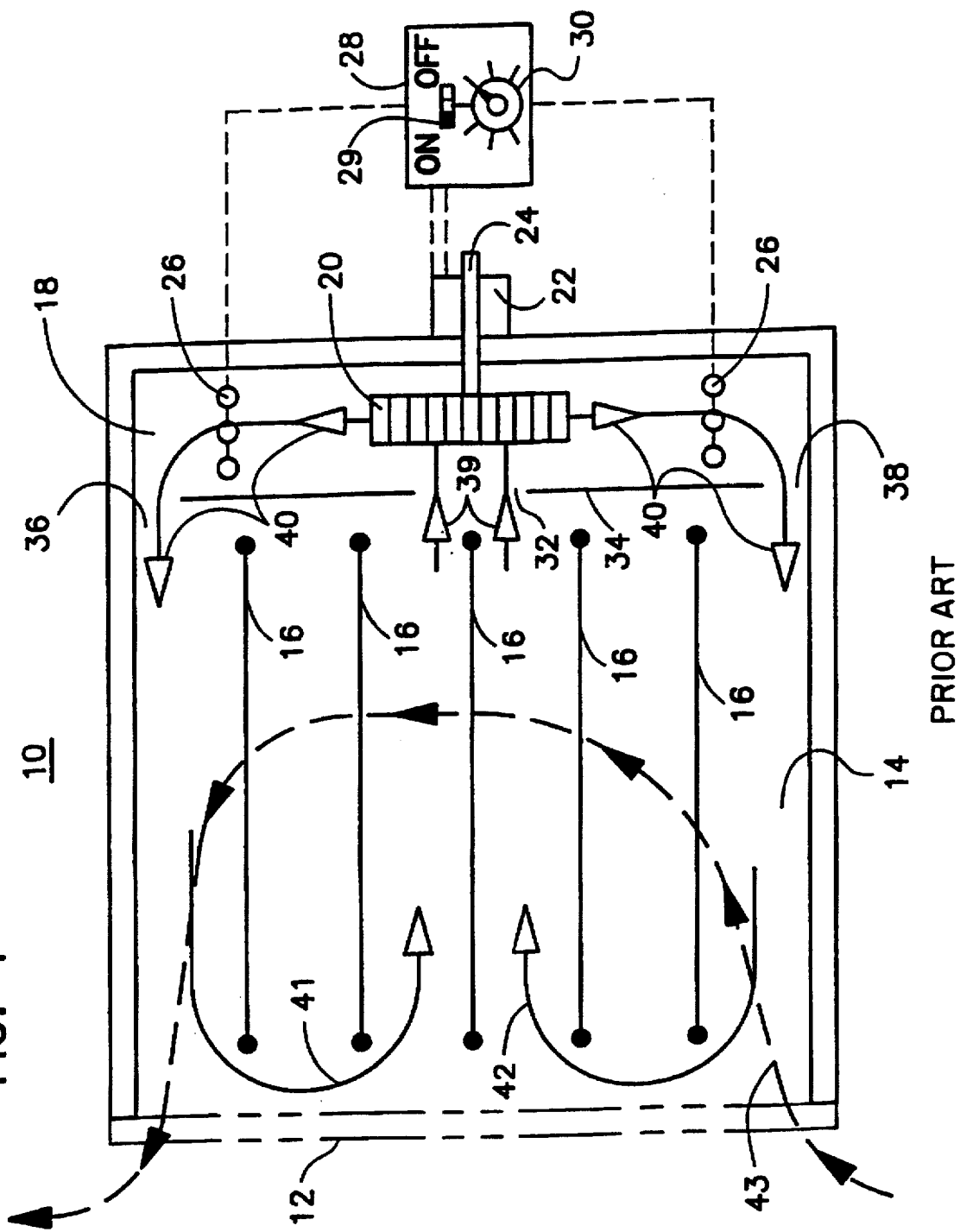
FIG. 1 is a schematic cross-sectional view of a typical prior art convection oven.

There is shown in FIG. 1 a typical convection oven 10 of the type used in retail baking operations. The oven 10 includes oven door 12 for inserting and removing product to be baked into oven cavity 14. Shelf-racks 16 support the product in oven cavity 14. Also included in oven 10 is a heating compartment 18. Contained within heating compartment 18 are three air heating coils 26 and a centrifugal fan 20 that is rotatably connected to fan motor 22 by means of shaft 24. Thermostat and fan control unit 28 includes an on/off switch 29 for operating the centrifugal fan and a heat control thermostat 30 for energizing heating coils 26 and maintaining the oven temperature at a desired set point. Thermostat and fan control unit 28 is depicted in FIG. 1 as a separate unit, however, this unit may be an integral part of convection oven 10.

In operation, the heating coils 26 are energized and begin to heat the air within compartment 18. Also, motor 22 is energized which in turn causes centrifugal fan 20 to rotate and intake air from oven cavity 14 through intake hole 32 in the center of heating compartment wall 34. The air drawn in from oven cavity 14 to heating compartment 18 by centrifugal fan 20 is then forced outward from the centrifugal fan 20 and passes through heating coils 26 which add heat energy to the air. The heated air is then forced out of the heating compartment 18 through slot 36 at the top of the heating compartment 18 and slot 38 at the bottom of heating compartment 18. The air entering and exiting heating compartment 18 follows the paths shown by arrows 39 and 40, respectively. Arrows 41 and 42 indicate the direction of air flow when oven door 12 is closed and centrifugal fan 20 is operational.

Centrifugal fan 20 would typically continue to be operational even after the thermostat set point has been reached and heating coils 26 have been deenergized to circulate the oven air contained in oven cavity 14 in order to evenly distribute the temperature throughout the cavity. The purpose of the forced-air convection is to transmit heated air rapidly to the oven walls and to the product being baked, as well as to mix the air thoroughly in order to insure that all air and oven material come to a reasonably uniform temperature. Even after the oven temperature is stabilized to the thermostat set point, forced-air convection is still required to prevent the hotter air from rising and remaining in the upper levels of the oven which would cause varying temperatures within the oven cavity 14.

When the oven door 12 is opened and the centrifugal fan 20 is off there is an in-rush of cooler air from outside the oven 10 following the path of dashed line 43. The air rushes in along the bottom of the oven cavity and the heated air is forced out along the top of the oven cavity 14 to the outside of the convection oven 10. In fast food retail operations convection oven doors are opened frequently and for varying periods of time and this causes the temperature to vary widely.

Figure 2:
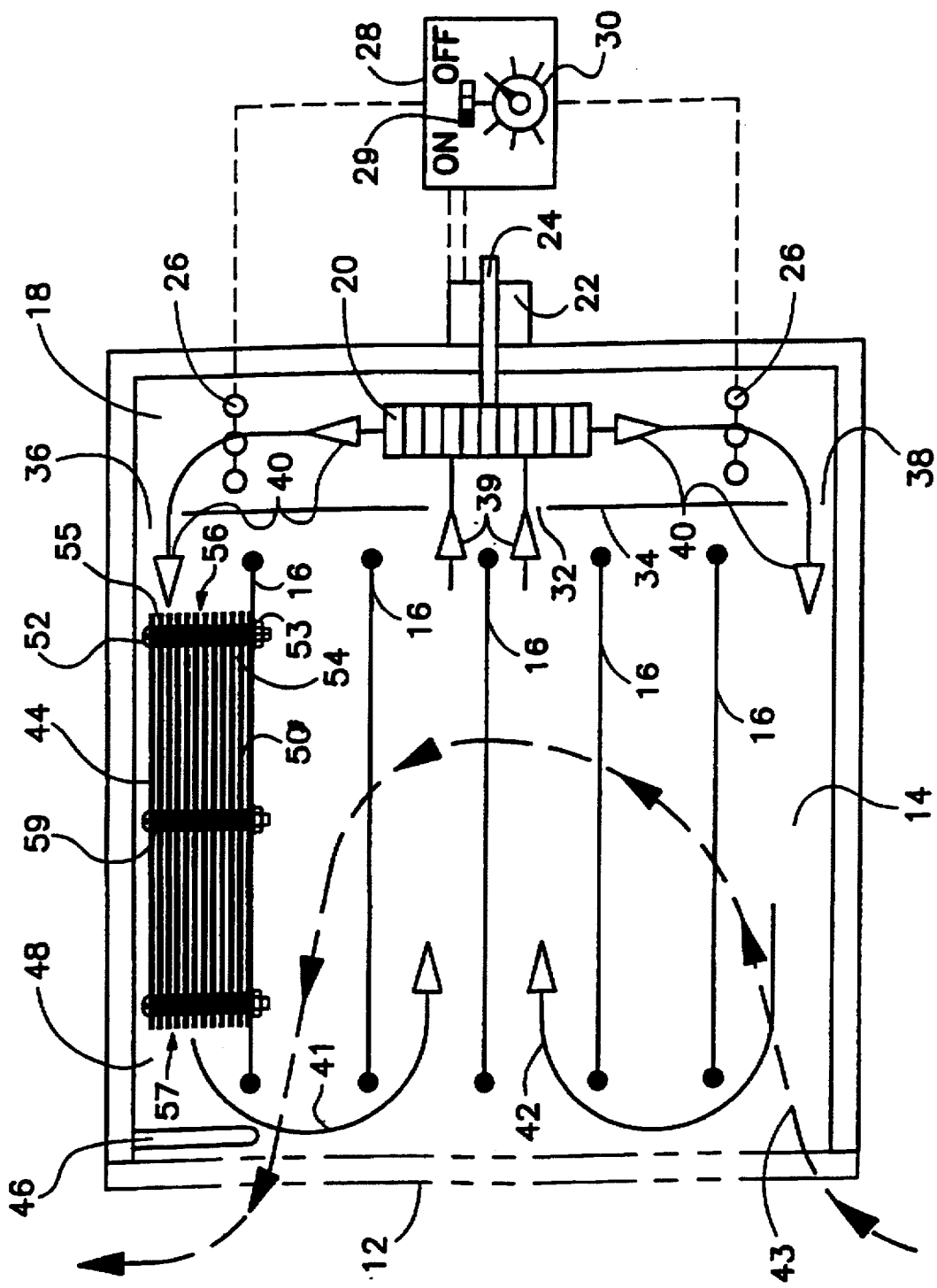
FIG. 2 is a cross-sectional view of a convection oven with a thermal energy storage and exchanger device in accordance with the present invention.

Convection oven 10, FIG. 2, according to this invention includes a thermal energy storage and exchanger device 44 located on the top shelf-rack 16 in oven cavity 14. Baffle 46 contacts the oven ceiling and the sidewalls of the oven and preferably extends to below the thermal energy storage and exchanger device 44. The baffle 46 serves to form a capped volume 48 above the top shelf rack 16 located between the baffle 46 and heating compartment wall 34. During still air periods hotter air in the oven cavity 14 rises and is retained in the capped volume 48 where it surrounds the thermal energy storage and exchanger device 44. Baffle 46 also helps to maintain hot air in the capped volume 48 when the oven door 12 is opened.

The thermal energy storage and exchanger device 44 includes a plurality of plates 50 which are superimposed and secured in place by bolts 52 inserted through a number of holes in the plates 50. Plates 50 are typically formed of steel, however, aluminum, copper, brick file, aluminum foil, glass, quartz and ceramic as well as any other suitable material could be used. The type of material used for plates 50 depends on the convection fluid being used, the cost, strength, weight, heat conductivity and thickness required of the material as well as the temperature range and emissivity desired. In FIG. 2 there are shown three bolts along one side of the plurality of plates 50 (not shown are three additional bolts along the far side of the plates). The bolts are secured by nuts 53 and a plurality of helical lock washers 59, shown more clearly in FIG. 3, provided on each bolt and located in the area 54 between each pair of plates to provide variable and uniform spacing as shown. Use of these partly compressed helical lockwashers provides for minimal conduction of heat between plates.

There are a number of flow passageways 55 that extend from the inlet edges 56 to the outlet edges 57 of plates 50. Thus, heated air exiting heating compartment 18 through slot 36 enters the flow passageways 55 at the inlet edges 56 of plates 50 and exits the flow passageways at the outlet edges 57 of plates 50. The thermal energy from the heated air when the centrifugal fan 20 and heating coils 26 are energized is easily and quickly transferred to the plates 50 of the thermal energy storage and exchanger device 44 due to the high surface-area to mass ratio of the plates 50. When the heating coils 26 and fan 20 are deenergized the thermal energy that has been transferred to the plates 50 of the thermal energy storage and exchanger device 44 remains very efficiently stored within the device. When the centrifugal fan 20 is re-energized and air is caused to flow through the flow passageways 55 the stored thermal energy is extracted from the device.

Thus, this device is useful in maintaining a more constant temperature within the oven during periods when the heating coils 26 are deenergized and centrifugal fan 20 is energized to maintain air circulation for a more even temperature profile throughout the oven cavity 14. Also, the device 44 is very useful in decreasing the preheat time of the oven cavity 14 as the stored thermal energy within the device 44 may be transferred out of the device to the oven cavity 14 to more quickly preheat the oven. This stored energy added by the device also effectively increases the oven power. Further, when the oven door is opened and closed during the baking operation the thermal energy storage and exchanger device 44 transfers the stored energy quickly and efficiently back to the oven cavity to heat the cold air drawn in by the door opening and maintain a more even temperature profile.

Figure 3A:
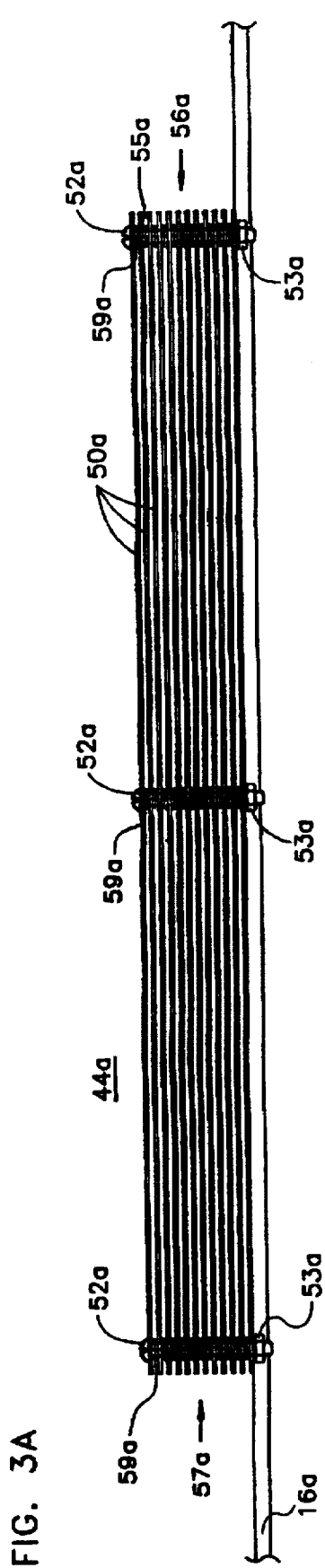
FIG. 3A is a more detailed schematic cross-sectional view of the thermal energy storage and exchanger device of FIG. 2.
Figure 3B:
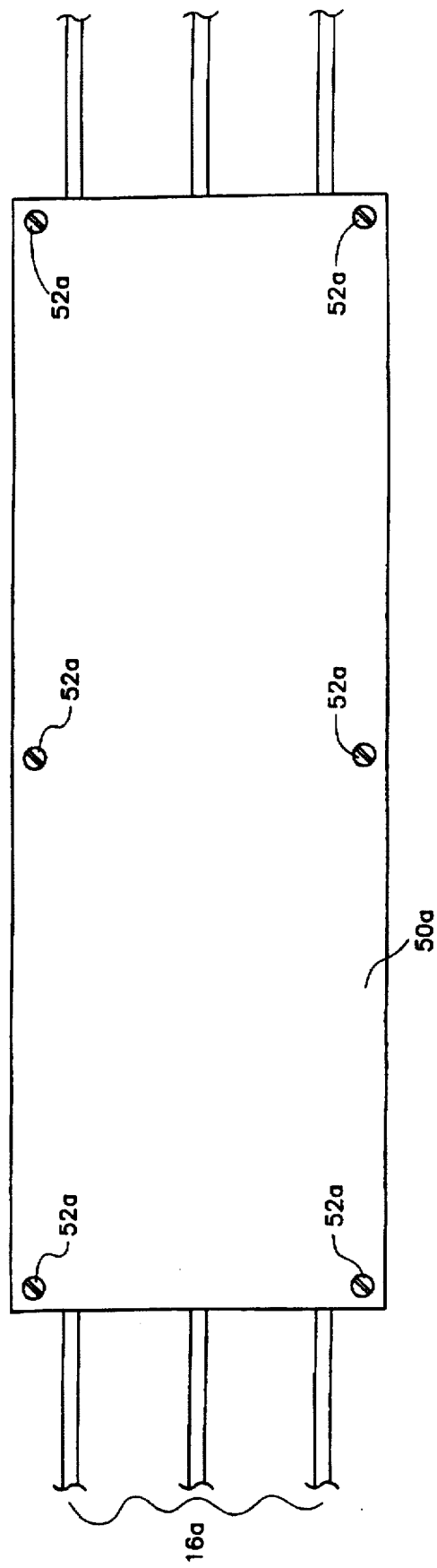
FIG. 3B is a top view of the thermal energy storage and exchanger device of FIG. 3A.

FIGS. 3A, 3B are a more detailed view of the thermal heat storage and exchanger device 44 of FIG. 2. The thermal energy storage and exchanger device 44a, FIG. 3A, seated on shelf-rack 16a, includes six bolts 52a, three of which are visible in this figure and three of which are not. All six bolts 52a are visible in FIG. 3B. Bolts 52a extend through six clearance holes in each of the plurality of plates 50a and are secured by nuts 53a. Below each metal plate hole is a helical lock washer 59a. Between each pair of plates 50a, there are formed flow passageways 55a through which air may flow from the inlet edges 56a to the outlet edges 57a of the metal plates 50a.

The plates 50a, when made of steel, are preferably approximately 1.25 millimeters in thickness, approximately six inches in width and twenty inches in length, however, various sizes may be utilized as long as a high surface-area to mass ratio is maintained. Also, any number of plates stacked one on top of the other may be used, however, fourteen plates is a number that works well in this configuration. A spacing of approximately 1.25–4.0 millimeters between steel plates 50a in the stack is suitable. Using alternate materials (e.g. copper, aluminum, glass, etc.) may require widely differing dimensions and yield a wide variety of performance specifications.

The thermal energy storage and exchanger device 44a very efficiently stores the thermal energy transferred to it after the oven convection flow is turned off. Since there are very short distances between the plates 50a resulting in very narrow flow passageways 55a the gravity induced convection currents are negligible there. In addition, radiation losses from the inner plates are very low since the losses tend to be absorbed by adjacent plates. Thus, the device is capable of storing a substantial amount of energy with a low rate of loss.

The helical lock washers 59a and nuts 53a allow the spacing between the plates 50a to be uniformly adjusted by simply screwing the nuts 53a to a different position on the bolts 52a. Reducing the spacing between the plates will retain the thermal energy stored in the device for longer periods during still air periods. Increasing the spacing between the plates 50a allows for greater air flow and faster thermal energy exchange during baking and preheating periods. The height of the stack of plates 50a may also be reduced by reducing the spacing between the plates 50a in order to reduce the total height of the thermal energy storage and exchanger device 44a to accommodate smaller size ovens.

The helical lock washer 59a, bolt 52a and nut 53a assemblies of the thermal energy storage and exchanger device 44a are typically made entirely out of steel and act as outstanding insulators in this configuration. Each lock washer 59a contacts the plates 50a at its two ends and sometimes, relatively lightly, at a point along its helical edge. Each bolt 52a may touch the inside of the hole in the plates 50a through which it is extends, but only at a point on the edge of one or two threads. Each bolt 52a may also touch some of the lock washers 59a at points on their inside diameters. Because the points of contact have such low conduction, and because the leakage paths have so many contact points in series, there is minimal thermal energy loss through the lock washer 59a, bolt 52a, and nut 53 assemblies.

Figure 4A:
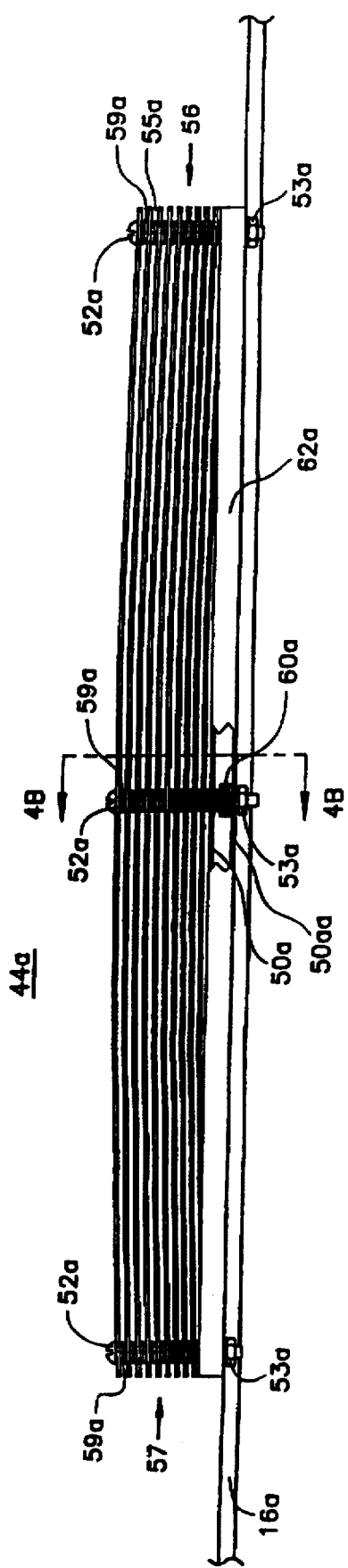
FIG. 4A is a view similar to FIG. 3A of an alternative thermal energy storage and exchanger device according to this invention.
Figure 4B:
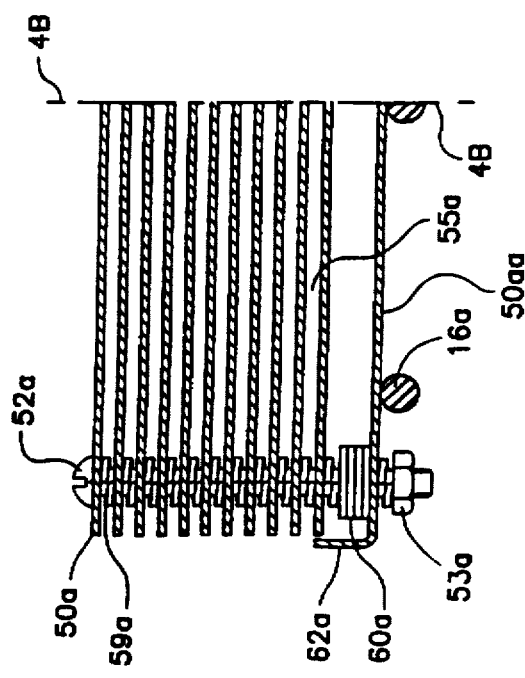
FIG. 4B is an enlarged, cross-sectional view of a portion of the thermal energy storage and exchanger device taken along line 4B—4B of FIG. 4A.

In an alternative construction, there is shown thermal energy storage and exchanger device 44a, FIGS. 4A and B, wherein the plates 50a are in a slightly arched concave configuration with the underside of each plate 50a being concave in shape. The arched configuration is accomplished by including flat washers 60a, in addition to helical lock washer 59a, between the bottom pair of plates 50a and 50aa on the two middle bolts 52a. It is preferred that a suitable number of washers 60a be inserted to raise the center of the stack of plates 50a by a distance equal to approximately one to four air gaps. Bottom plate 50aa may include turned up flanged portion 62a on either side of the thermal energy storage and exchanger device 44a which adds to the stiffness of the plate 50aa thereby enabling a sufficient upward force to be applied to the centers of plates 50a to form the arched configuration.

The arched configuration may also be controlled by forming the plates into a slight cylindrical curvature or a single crease at the midline of each plate may be formed. The plates need not take any specific shape except that the two ends are below the higher mid-line. With preformed arches, the bottom flat plate may not be necessary for support.

Figure 5B:
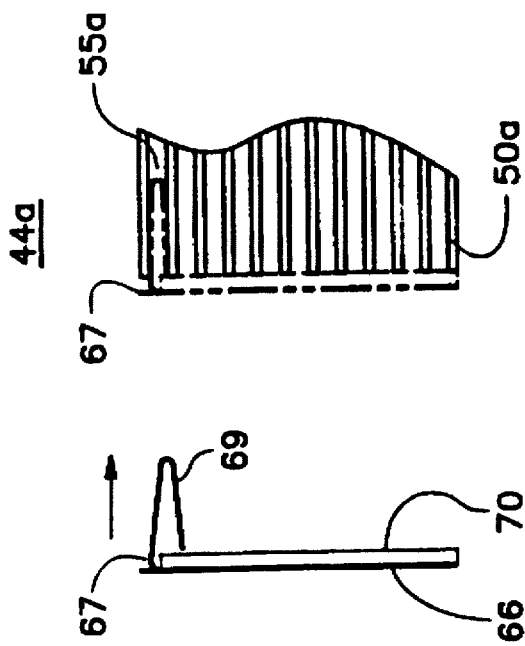
FIG. 5B is a schematic end view of the thermal energy storage and exchanger device showing the installation of the sidecovers of FIG. 5A.

When the sides of the thermal energy storage and exchanger device 44a of FIG. 4A, in the arched configuration, are covered by side covers as shown in FIG. 5 A-B and described below, a more effective hot air trap is formed between each adjacent pair of plates.

When this arched stack is heated and surrounded by dormant colder air the flow passageways 55a forming arched cavities will hold lighter hot air in a stable state since the heavier cold air will not rise into the arched cavities.

If a quick low-pressure puff of the cold air is then directed at either end (inlet 56 or outlet 57) of the flow passageways 55a it forces the cold air partway up into the arched cavity and expels an equal volume of lighter hot air from the other end. When the puff is over, gravity causes about half of the injected cold air to back out until an equal weight of cold air is sucked in from the other end to equalize the pressures at both ends of the arch and stop further flow. This trapping property of the arched cavity is a simple and effective way to protect the heated stack from cooler low-level convection currents.

To overcome this arched air trap and maintain a steady flow of cooler air through the heated stack, a minimum threshold pressure must be applied to push the injected cold air up and over the top of the arched cavities formed by the flow passageways 55a. Once the cold air starts spilling down the other side the arch, less threshold pressure is needed for flow since the difference in the air densities of the two sides of the arch has been reduced.

The threshold pressure to start flow may be expressed as:

$$p=(x-i)a$$

where:

| | |
|---|---|
| $p$ = threshold pressure of arch | (lb./sq. in.) |
| $x$ = air density outside arch | (lb./cu. in.) |
| $i$ = air density inside arch | (lb./cu. in.) |
| $a$ = height of arch cavity | (in.) |

The arched stack configuration is also effective in preventing leakage due to horizontal tilting in the stack. With flat plates a small but continual convection leakage flow occurs in direct proportion to any angle of tilt, since there is no threshold pressure when a=o. With arched plates, comparable tilting will only slightly reduce the effective arch height by the difference in height between the ends of the arch. Thus, leakage flow from tilt can be blocked by using the arched stack as an air trap.

The arched stack configuration is also more effective than the flat stack in both retaining and accumulating heat when the oven is turned off after a preheat or baking cycle. With forced convection flow shut down, the hotter oven air rises and gradually fills the capped volume of the oven from the ceiling down to beneath the arched stack.

As the temperature of the air outside each arched cavity exceeds that of the air inside, an unstable condition is created. The cooler air inside starts to drip out while the now warmer and lighter outside air percolates up into the arched cavities until both temperatures become equal. In this manner a significant amount of the heat in the dormant oven cavity will be steadily salvaged into the stack, instead of being lost through the oven enclosure.

As the oven air cools further, the temperature of the air around the stack eventually drops below that of the stack air, creating the stable threshold pressure described earlier.

The pressure driving the salvaging action may be computed using the same threshold formula above. In this case a negative value for the threshold pressure results, indicating the unstable salvaging pressure state.

The formula also indicates that, with a=0, the flat stack has negligible threshold or salvaging pressure features available. Without these improvements for holding and salvaging, the flat stack is a less preferable alternative to the arched stack.

Figure 4C:
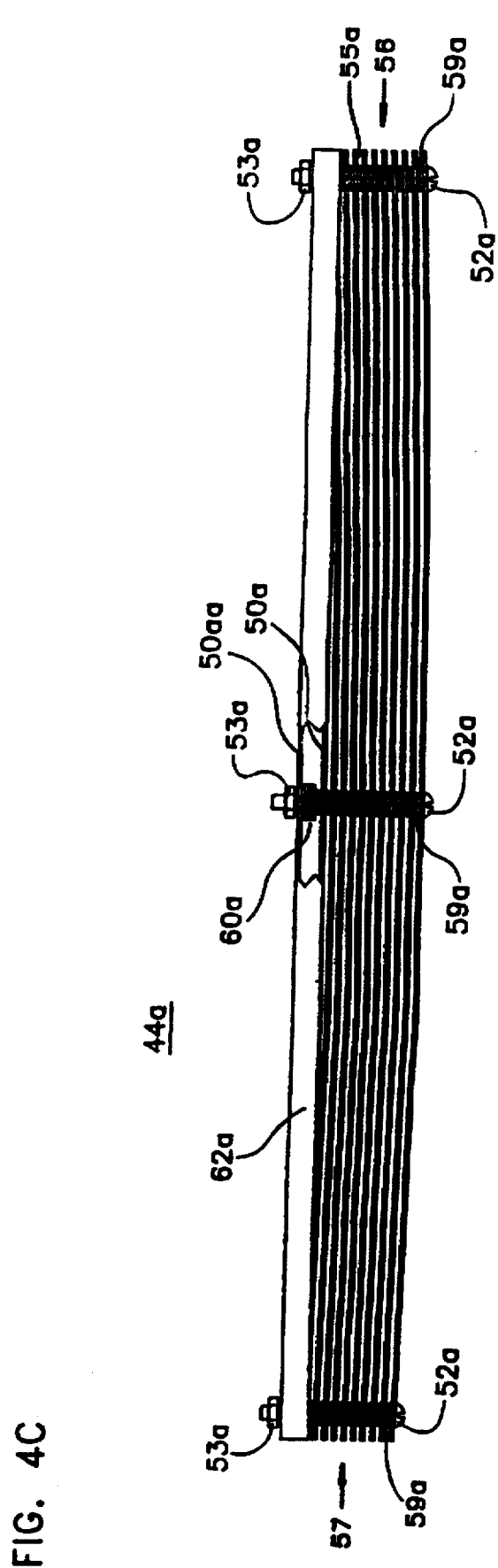
FIG. 4C is a view similar to FIG. 4A wherein the thermal energy and exchanger device is in the inverted configuration for cold storage and exchange.

A negative arch height (a<0) indicates simply that the arch is inverted and the concave surfaces of the plates 50a face upwards as shown in FIG. 4C. In that case, the invention may be used in an analogous reverse configuration to stably hold colder air rather than hotter air. The inverted stack would be placed in a cupped volume at the floor of a refrigerator, for example, instead of in a capped volume at the ceiling of an oven. The cold air, after forced convection flow is stopped, will travel down into the cupped volume and fill the cupped cavities of the inverted arched stack, from the bottom up, in a direction opposite to the oven example above.

The threshold pressure would still be positive when indicating the stable holding mode and negative for indicating the unstable salvaging mode, as it was in the analogous oven example.

Whenever forced convection flow is started, all air is quickly purged from the stack and the density difference term (x–i) is driven to zero, leaving the forced convection flow unimpeded. With the flat stack no arch threshold pressure ever exits, since a=0. Alternatively, the flat stack may be fitted with a flap valve threshold device as described below. However, the flap valve requires substantial pressure to hold it open, and reduces the forced convection flow.

To better understand the threshold pressure equation above, it helps to use it on two simple prior art examples of the fluid threshold trap. The more apparent example is the inverted arch in the drain pipe under the common sink. Since it is U-shaped, the arch has a negative height and therefore will trap heavier fluids. With the heavier fluid in the trap, lighter fluids must exert an added threshold pressure to start flow. The other prior art example is the uninverted arch used often in flue pipes, air vent pipes and clothes drier exhaust pipes. With their positive arch heights, hotter air will be entrapped in their arches, while cooler air flow will be resisted unless the threshold pressure is exceeded.

Summarizing, the arched stack will accumulate more oven heat and hold it with significantly less leakage than will the flat stack. The arched stack will also tolerate more flit, presents no added drag to the forced convection flow, uses less room and has no moving parts.

Figure 5A:
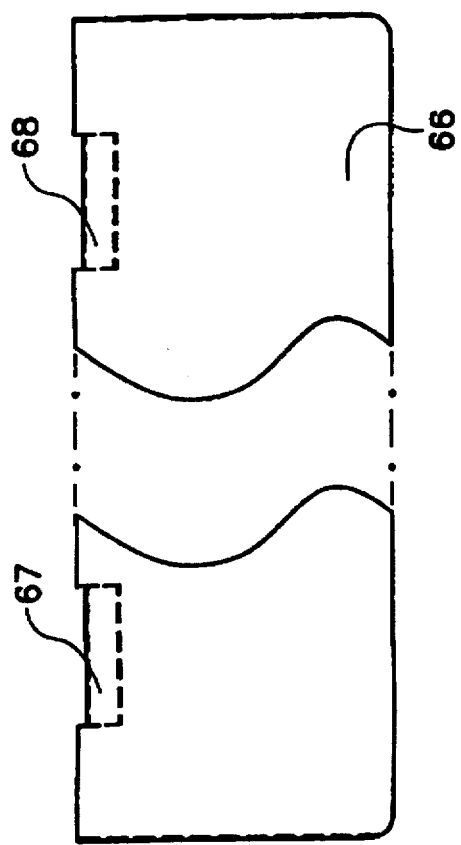
FIG. 5A is a side elevational view of a thermal energy storage and exchanger device of this invention with sidecovers.

The flat stack configuration of FIG. 3A may, and the arched stack configurations of FIG. 4A and 4C do, include sidecovers 66, FIG. 5A, installed on both sides of the thermal energy storage and exchanger device 44a extending from the inlets to the outlets of the flow passageways 55a. Side plates 66 prevent stored thermal energy from leaking out the sides of thermal energy storage and exchanger device 44a. The side plates 66 include tabs 67 and 68 for affixing the sideplates 66 to the heat storage and exchanger device 44a. The construction of tabs 67 and 68 is more fully shown in FIG. 5B, wherein there is shown tab 67 formed from sideplate 66. Tab 67 includes V-shaped portion 69 which may be compressably inserted into the top flow passageway 55a. Sideplate 66 may be angled at slightly less than 90° so that the bottom of the sideplate 66 is spring-loaded against the stack edges when the tabs are pushed in fully. An insulation layer 70 may be included to further decrease the leakage of stored thermal energy from the device 44a, such as 2 mm thick FIBERFRAX-970J paper, made by The Carborundum Company Fibers Division, Niagara Falls, N.Y. 14302.

Figure 6A:
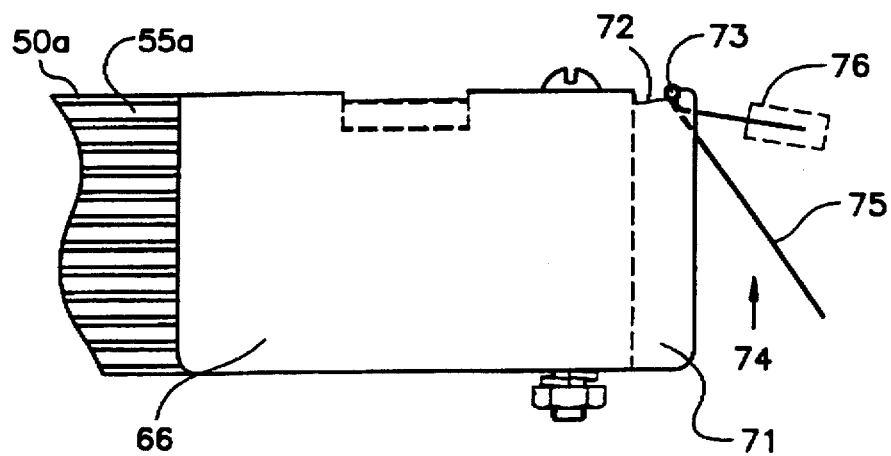
FIG. 6A is a schematic side elevational view of a thermal energy storage and exchanger device according to this invention with a flap valve.
Figure 6B:
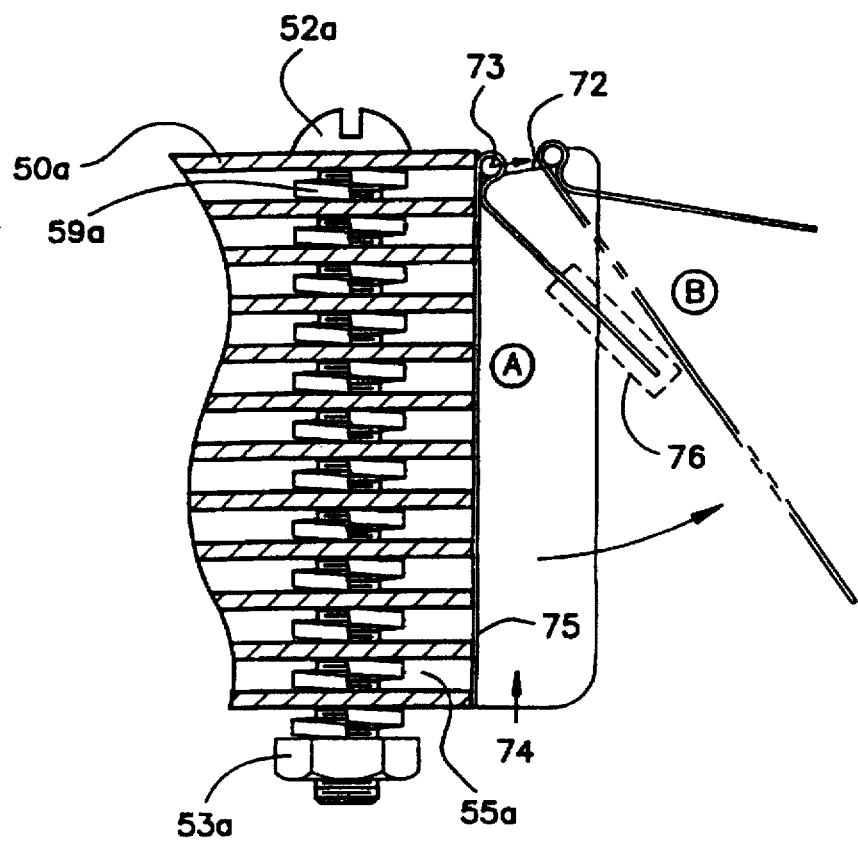
FIG. 6B is an enlarged, schematic, cross-sectional view of a portion of the thermal energy storage and exchanger device of FIG. 6A demonstrating the operation of the flap valve in more detail.

Sideplate 66 may also include a portion 71, FIGS. 6A and 6B, extending beyond the outlet of the flow passageways 55a, which includes an upwardly angled notch portion 72 for receiving rod 73. Rod 73 supports flap valve 74 that is formed by compressing it around rod 73. Flap valve 74 includes a portion 75 for closing against the outlets of flow passageways 55a and portion 76, shown within dashed lines, spaced from portion 75, for shifting the center of gravity of flap valve 74 to establish a threshold pressure needed to open the outlets of flow passageways 55a.

The operation of flap valve 74 is more clearly shown in FIG. 6B where flap valve 74 is shown in position A with portion 75 positively closed against flow passageways 55a when there is no air flowing through flow passageways 55a. In position B, shown in phantom, when air is flowing through flow passageways 55a rod 73 is forced up along notch 72 in portion 71 of side plate 66 and flap valve 74 is caused to open to allow the air to flow out from the outlet edges of flow passageways 55a. When the flow of air stops, rod 73 and flap valve 74 merely slide back down along notch 72 and flap valve 74 is caused to be positively closed against the outlets of flow passageways 55a by the flap-valve threshold pressure described above.

Flap valve 74 helps to retain thermal energy within the flow passageways 55a when the thermal energy storage and exchanger device 44a is in the storage mode and fluid resides in the flow passageways 55a undriven by the fan of the convection oven. The flap valve 74 is typically utilized when the thermal energy storage and exchanger device 44a is configured in a flat stack with sidecovers. In the arched configuration the flap valve is not necessary, since the threshold pressure of the arch is adequate to block flow.

Figure 7:
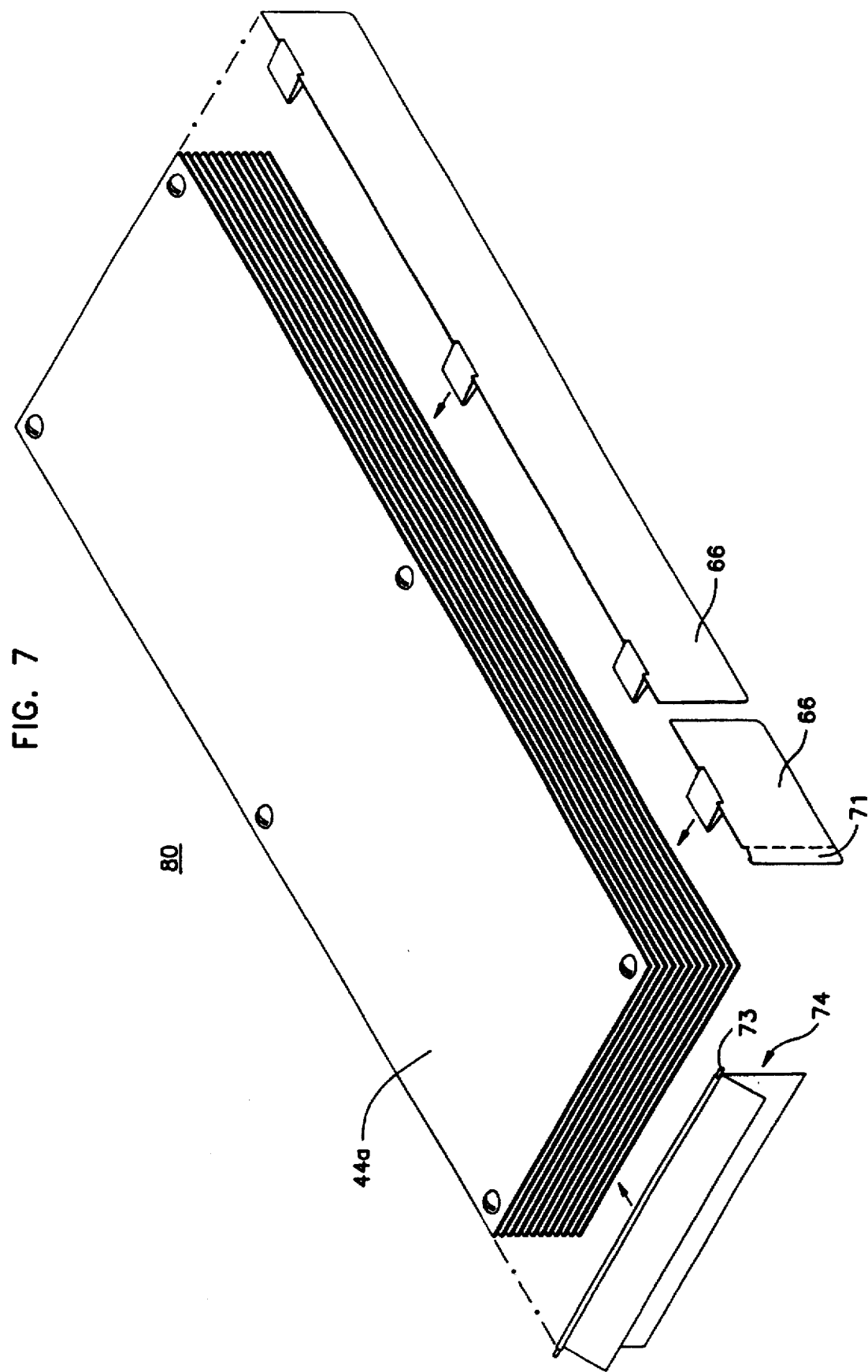
FIG. 7 is an exploded view of the thermal energy storage and exchanger device of this invention including sidecovers and a flap valve.

A full featured flat stack thermal energy storage and exchanger system 80, FIG. 7, according to this invention includes thermal energy storage and exchanger device 44a with side covers 66 wherein one sidecover includes portion 71. There is a flap valve 74 supported by rod 73. Identical sidecovers 66, one with portion 71, would also be installed on the opposite side of thermal energy storage and exchanger device 44a. In the simplest flat stack configuration, the flap valve 74 and side covers 66 would not be utilized.

Figure 8A:
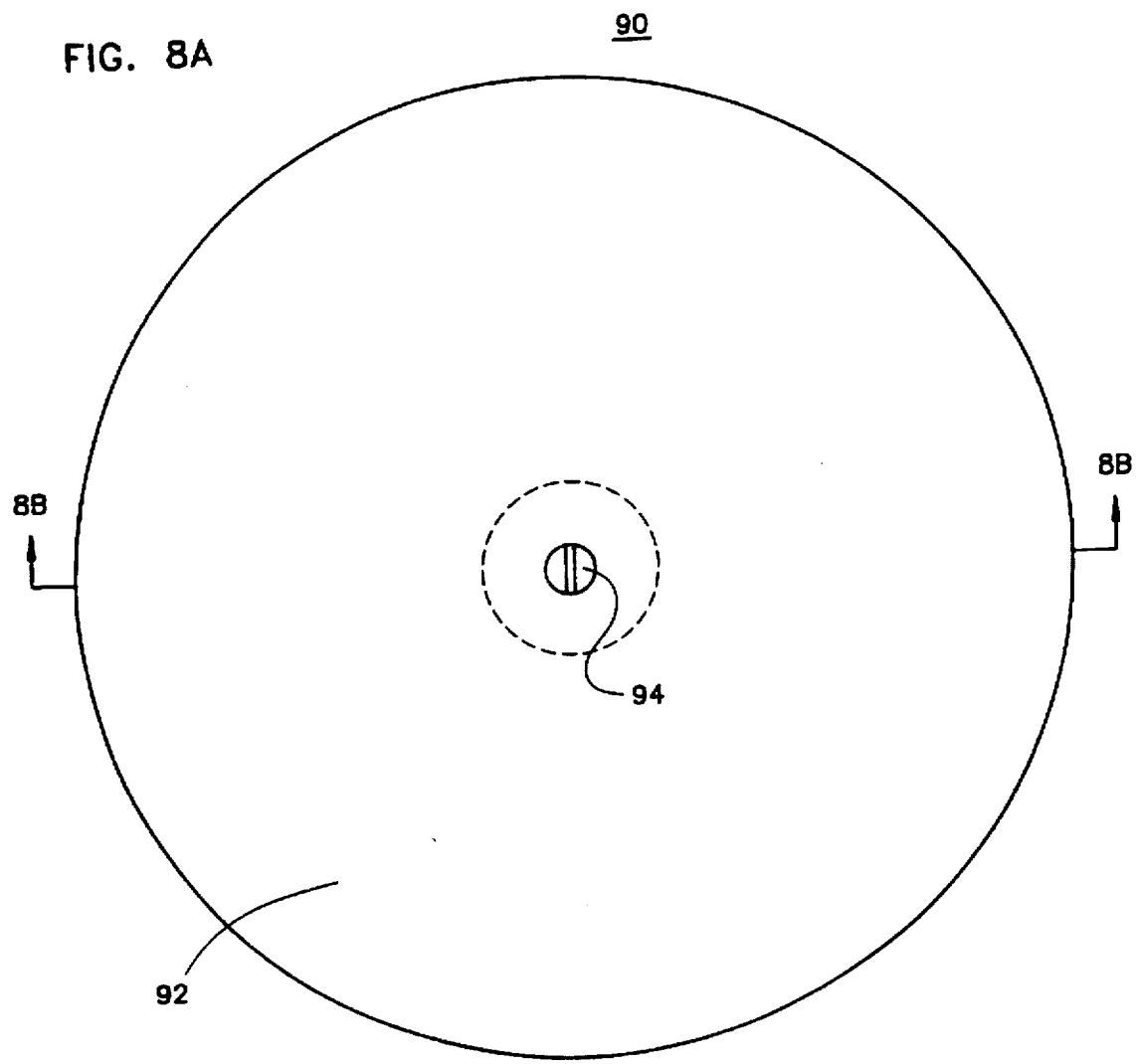
FIG. 8A is a top view of an alternative, circular, domed thermal energy storage and exchanger device according to this invention.

Another embodiment of the invention which is useful and also very simple to manufacture is a circular, concave, domed thermal energy storage and exchanger device 90, FIGS. 8A and B, which includes a plurality of thin plates 92 bent so as to form a very shallow concave shape on their undersides such as a spherical or paraboloidal surface. The depth of the cavity formed from making the undersides of the plates concave is typically one (1) to four (4) or more times the space between the plates. The plates are held in the domed stack formation by a single bolt 94 which extends through a hole in the center of each disc 92 and also through insulated washers 96 that are between each pair of plates. The washers are wide enough and solid enough to maintain uniform spacing between the plates. The bolt 94 is secured by nut 98.

Figure 9A:
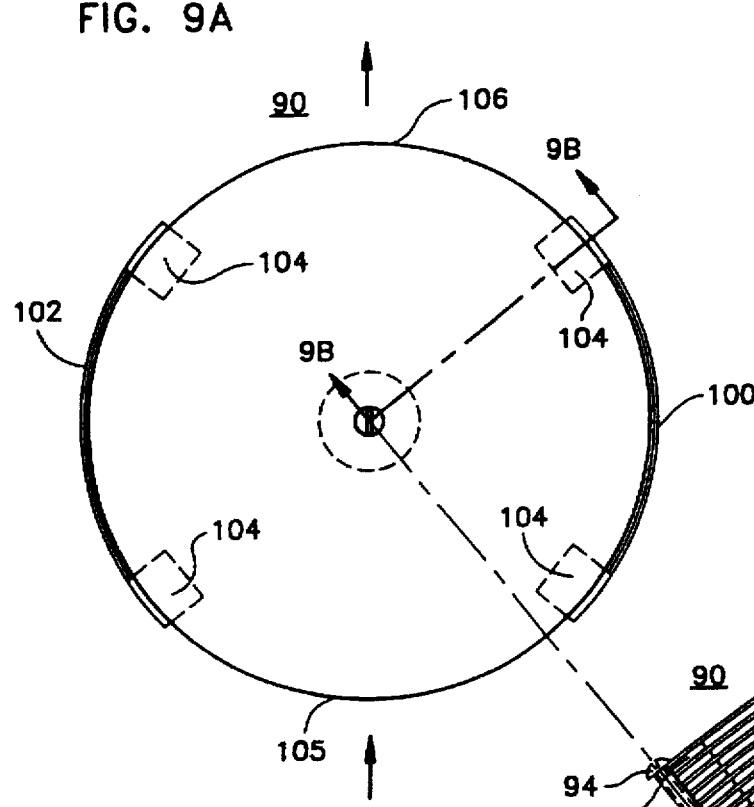
FIG. 9A is a top view of the circular, domed thermal energy storage and exchanger device of FIG. 8A with sidecovers.
Figure 9B:
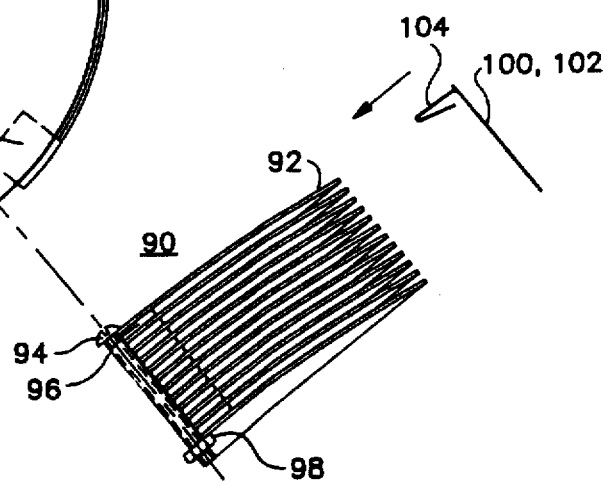
FIG. 9B is a cross-sectional view of the thermal energy storage and exchanger device taken along line 9B—9B of FIG. 9A showing the installation of sidecovers.

The circular, domed stack 90 may be employed omnidirectionally or with sidecovers 100, 102, FIG. 9A, which may be attached around sectors of the stack 90 in order to create, for example, inlet 105 and outlet 106. The covers are mounted with integral tabs 104, as shown in FIG. 9B in the manner described above with regard to FIGS. 5A, 5B.

Figure 10A:
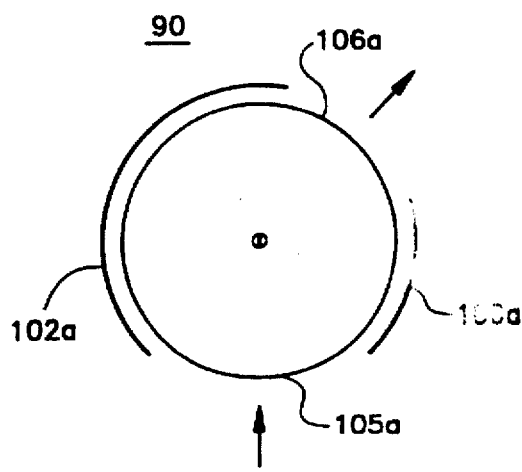
FIGS. 10A and 10B are top views of the thermal energy storage and exchanger device of FIG. 9A with the sidecovers installed in different configurations.
Figure 10B:
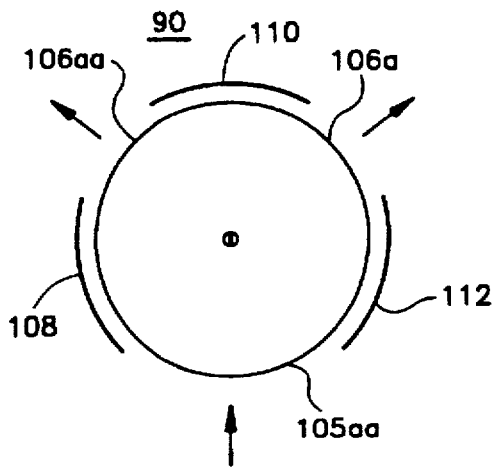

FIG. 10A shows side covers 100a and 102a on domed stack 90 in a slightly different configuration than the side covers shown in FIG. 9A. With this configuration the thermal energy exchanger fluid exits at outlets 106a at an angle different than the fluid exits outlets 106 in FIG. 9A. There is shown in FIG. 10B three side covers 108, 110 and 112 separating the domed stack into three sections; namely, inlets 105aa where the thermal energy exchanger fluid enters the domed stack 90 and two exits at outlets 106a and 106aa.

The circular, domed stack 90 accomplishes all the essential functions of the rectangular arched stack, but is useful in many applications where a simple cylindrical stack shape is preferable.

With either of these stacks, or variations thereof, the concavity of the flow passageways allows the stack to both salvage and store heat or cold thermal energy much more effectively than with the flat stack. Selecting between the types of thermal energy to be stored is done by simply inverting the concave stack. Heat energy is effectively salvaged and stored with the concavities facing down. When cold energy salvaging and storage is desired, the concavities face up. For these reasons the principle preferred embodiment for the thermal energy storage and exchanger device is the concave stack.

Figure 8B:
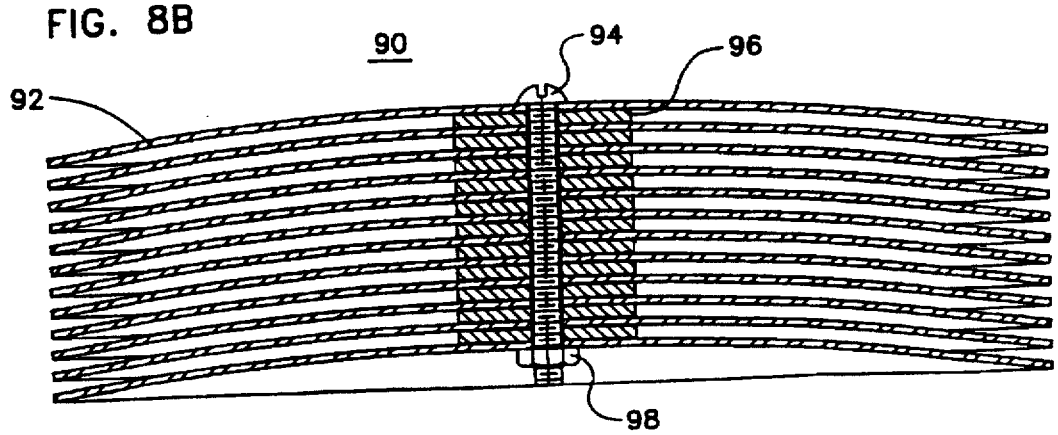
FIG. 8B is a cross-sectional view of the circular, domed thermal energy storage and exchanger device taken along line 8B—8B of FIG. 8A.

It should also be noted that the perimeter plane of the domed plates need not be only circular as shown in FIG. 8 and 9. Rectangular, triangular, or other forms of the domed plate base may be used for advantages such as compactness, or ease of manufacturing.

It is of interest to note that, if the oven heater coils were convened to cooling coils and the entire assembly in FIG. 2., of oven, baffle, and arched or domed plates were inverted, a refrigeration system would result wherein the thermal energy storage device and exchanger of this invention would work similarly for a cooling system. As with the oven application, this cold storage, exchanger and salvager device could provide cold energy storage that would enable the system to use a lower power cooling system. In a building heating and cooling application these devices could be used to store both heat and cold in separate stacks.

The foregoing devices and systems may also be used to store, exchange and salvage heat or cold in systems using convecting liquids instead of air, such as done in heat pump or solar hot water systems.

The above devices also make it possible to store thermal energy during the cheaper off-peak hours and then use it during the peak price hours, thereby reducing energy bills.

Although specific features of this invention are shown in some drawings and not others, this is for convenience only as each feature may be combined with the other features in accordance with the invention.

Other embodiments will occur to those skilled in the art and are within the following claims:

What is claimed is:

1. A passive thermal energy storage and exchanger device, comprising:

a plurality of horizontal superimposed spaced plates defining a plurality of clear, horizontal, continuous flow passageways between them;

introduction means selectively operable for driving a thermal energy exchange fluid horizontally through said flow passageways to introduce thermal energy to said plates in one mode and extract thermal energy from said plates in a second mode; said plates being vertically spaced and horizontally oriented to trap said exchange fluid between them in a third, storage mode when said thermal energy exchange fluid resides in said flow passageways undriven by said introduction means; and spacing means for separating said plates and minimizing naturally occurring convection currents and thermal conduction between said plates.

2. The thermal energy storage and exchanger device of claim 1 in which said introduction means includes pump means for driving said thermal energy exchanger fluid through said flow passageways for exchanging thermal energy with said plates.

3. The thermal energy storage and exchanger device of claim 1 in which said plurality of plates are arranged in a flat stack.

4. The thermal energy storage and exchanger device of claim 1 in which said plurality of plates are arranged in an arched stack.

5. The thermal energy storage and exchanger device of claim 1 in which said plurality of plates are arranged in a domed stack.

6. The thermal energy storage and exchanger device of claim 1 in which said plates are spaced between 1.25 and 4.0 millimeters apart.

7. The thermal energy storage and exchanger device of claim 1 further including sidecovers mounted on said plates for closing said flow passageways along their edges extending along the flow direction of said fluid for reducing fluid escape from said flow passageways.

8. A passive convection heater improvement kit, comprising:

a baffle for forming a capped volume beneath the ceiling of the convection heater;

a thermal energy storage and exchanger means contained in said capped volume including a plurality of horizontal, superimposed, spaced plates defining a plurality of clear, continuous flow passageways between them;

pump means selectively operable for driving a thermal energy exchange fluid horizontally through said flow passageways to introduce thermal energy to said plates in one mode and extract thermal energy from said plates in a second mode; said plates being vertically spaced and horizontally oriented to trap said exchange fluid between them in a third, storage mode when said thermal energy exchanger fluid resides in said flow passageways undriven by said pump means; and spacing means for separating said plates and minimizing naturally occurring convection currents and thermal conduction between said plates.

9. The improved convection heater of claim 8 in which said plurality of plates are arranged in a flat stack.

10. The improved convection heater of claim 8 in which said plurality of plates are arranged in an arched stack.

11. The improved convection heater of claim 8 in which said plurality of plates are arranged in a domed stack.

12. The improved convection oven of claim 8 in which said plates are spaced between 1.25 and 4.0 millimeters apart.

13. The improved convection heater of claim 10 further including sidecovers mounted in said plates for closing said flow passageways along their edges extending along the flow direction of said fluid for reducing fluid escape from said flow passageways.

14. A passive thermal energy storage and exchanger device, comprising:

a plurality of horizontal, superimposed, spaced, concave, plates defining a plurality of clear, continuous, uniformly spaced, concave flow passageways between them;

pump means selectively operable for driving a thermal energy exchange fluid horizontally through said flow passageways to introduce thermal energy to said plates in one mode and extract thermal energy from said plates in a second mode; said plates being vertically spaced and horizontally oriented to trap said exchange fluid between them in a third, storage mode when said thermal energy exchange fluid resides in said flow passageways undriven by said pump means; and spacing means for separating said plates and minimizing naturally occurring convection currents and thermal conduction between said plates.

15. The thermal energy storage and exchanger device of claim 14 in which the undersides of said plates are concave.

16. The thermal energy storage and exchanger device of claim 14 in which the top sides of said plates are concave.

17. The thermal energy storage exchanger device of claim 14 in which said plates are dome shaped.

18. The thermal energy storage exchanger device of claim 14 in which said plates are arched.

19. The improved convection heater of claim 8 in which the heater is a convection oven.

20. An improved convection heater comprising:

a compartment to be heated;

a source of heat;

means for driving a fluid over said source of heat and about said compartment; and heat storage means including a stack of spaced plates located horizontally within said compartment operable in three modes:

a first mode for receiving the driven fluid while said means for driving is functioning to heat said plates by convection;

a second mode for trapping the heated fluid between said plates when said means for driving is not functioning; and a third mode for convectively withdrawing heat from said plates when said means for driving is again functioning.

21. The improved convection heater of claim 20 in which said heat storage means further includes resistive spacing means for separating said plates and minimizing thermal conduction between said plates.

* * * * *